Patented Feb. 28, 1950

2,498,912

UNITED STATES PATENT OFFICE 2,498,912

PROCESS FOR GLAZING EARTHENWARE AND GLAZE THEREFOR

Aymon François Max Claudet, Orly, France, assignor to Societe des Usines Chimiques Rhone-Poulenc, Paris, France, a body corporate of France No Drawing. Application August 20, 1946, Serial No. 691,886. In France May 11, 1944

Section 1, Public Law 690, August 8, 1946
Patent expires May 11, 1964

6 Claims. (Cl. 106—48)

This invention is for improvements in or relating to enamels or glazes for earthenware.

There have been numerous proposals for solving the problem of preparing enamels without boron or lead for temperatures of application between 1000° and 1100° C., but these glazes, generally rich in alkalies, had the disadvantage of crazing on the usual earthenware clays, although in certain cases this drawback could be overcome by replacing $Na_2O$ by $K_2O$. However, up to the present, no enamels free from boron and lead have been found for the important common earthenware and pottery industry, of which the firing temperatures are between 900° and 980° C.

It has now been found that the firing temperature of enamels and earthenware coatings free from boron and lead can be reduced to 850° C. According to the present invention, this result can be obtained by means of compositions which contain, in addition to the usual constituents of glazes (silica, alumina, alkaline oxides, zinc oxide), also the oxides of titanium and barium; the chief effect of the simultaneous presence of these latter oxides is the lowering of the glazing temperature considerably below the limits known heretofore.

Another advantage which accrues from this invention is that the quantity of alkaline oxides can be considerably reduced in comparison with the boron- and lead-free compositions already known. In consequence, it is possible to overcome efflorescence and, on the usual clays, the crazing inevitably produced with very alkaline glazes.

The new glazes obtained according to the present invention have, moreover, the advantage of exhibiting high resistance to acids, and in particular culinary acids, the corrosive action of which on the usual enamels is well known.

The following molecular compositions are illustrative of glazes of the present invention:

*1st composition.*—Earthenware coating glazing at 850° to 950° C.

$$\left.\begin{array}{l}2.83\ SiO_2\\ 0.10\ TiO_2\end{array}\right\} \quad 0.1\ Al_2O_3 \quad \left\{\begin{array}{l}0.38\ Na_2O\\ 0.13\ K_2O\\ 0.04\ CaO\\ 0.20\ BaO\\ 0.25\ ZnO\end{array}\right.$$

*2nd composition.*—Earthenware coating for 1000° to 1100° C.

$$\left.\begin{array}{l}3.6\ SiO_2\\ 0.10\ TiO_2\end{array}\right\} \quad 0.22\ Al_2O_3 \quad \left\{\begin{array}{l}0.33\ Na_2O\\ 0.12\ K_2O\\ 0.05\ CaO\\ 0.20\ BaO\\ 0.30\ ZnO\end{array}\right.$$

The mixture of raw materials ordinarily utilised for the preparation of frits is fused at about 1250° C. and poured into water. The frit is ground to the usual fineness in the presence of water with any desired additions, applied to the ceramic support and fired at a temperature between 850° and 950° C. for composition (1) and between 1000° and 1100° C. for composition (2). In both cases, a very brilliant glaze is obtained which fully satisfies requirements.

Based on the foregoing examples, it will be perceived that the range of percentage of ingredients of the coating is as follows:

| | Per cent |
|---|---|
| $SiO_2$ | 61.4–64.3 |
| $TiO_2$ | 2.4–2.9 |
| $Al_2O_3$ | 3.7–6.7 |
| $Na_2O$ } $K_2O$ | 9.4–12.9 |
| CaO | 0.8 |
| BaO | 9.0–11.1 |
| ZnO | 7.2–7.3 |

I claim:

1. Process of producing glazed earthenware which consists in applying to a ceramic support a frit of the following molecular composition:

$$\left.\begin{array}{l}2.83\ SiO_2\\ 0.10\ TiO_2\end{array}\right\} \quad 0.1\ Al_2O_3 \quad \left\{\begin{array}{l}0.38\ Na_2O\\ 0.13\ K_2O\\ 0.04\ CaO\\ 0.20\ BaO\\ 0.25\ ZnO\end{array}\right.$$

and firing the coated support at a temperature of 850° to 950° C.

2. Process of producing glazed earthenware which consists in applying to a ceramic support a frit of the following molecular composition:

$$\left.\begin{array}{l}3.6\ SiO_2\\ 0.10\ TiO_2\end{array}\right\} \quad 0.22\ Al_2O_3 \quad \left\{\begin{array}{l}0.33\ Na_2O\\ 0.12\ K_2O\\ 0.05\ CaO\\ 0.20\ BaO\\ 0.30\ ZnO\end{array}\right.$$

and firing the coated support at a temperature of 1000° to 1100° C.

3. A glaze for earthenware of the following molecular composition:

$$\left.\begin{array}{l} 2.83\ SiO_2 \\ 0.10\ TiO_2 \end{array}\right\} \quad 0.1\ Al_2O_3 \quad \left\{\begin{array}{l} 0.38\ Na_2O \\ 0.13\ K_2O \\ 0.04\ CaO \\ 0.20\ BaO \\ 0.25\ ZnO \end{array}\right.$$

4. A glaze for earthenware of the following molecular composition:

$$\left.\begin{array}{l} 3.6\ SiO_2 \\ 0.10\ TiO_2 \end{array}\right\} \quad 0.22\ Al_2O_3 \quad \left\{\begin{array}{l} 0.33\ Na_2O \\ 0.12\ K_2O \\ 0.05\ CaO \\ 0.20\ BaO \\ 0.30\ ZnO \end{array}\right.$$

5. Process for producing glazed earthenware which consists in applying to a ceramic support a frit of the following weight percentage composition:

|  | Per cent |
|---|---|
| $SiO_2$ | 61.4–64.3 |
| $TiO_2$ | 2.4–2.9 |
| $Al_2O_3$ | 3.7–6.7 |
| $Na_2O$ $K_2O$ | 9.4–12.9 |
| $CaO$ | 0.8 |
| $BaO$ | 9.0–11.1 |
| $ZnO$ | 7.2–7.3 |

6. A glaze for earthenware of the following weight percentage composition:

|  | Per cent |
|---|---|
| $SiO_2$ | 61.4–64.3 |
| $TiO_2$ | 2.4–2.9 |
| $Al_2O_3$ | 3.7–6.7 |
| $Na_2O$ $K_2O$ | 9.4–12.9 |
| $CaO$ | 0.8 |
| $BaO$ | 9.0–11.1 |
| $ZnO$ | 7.2–7.3 |

AYMON FRANÇOIS MAX CLAUDET.

REFERENCES CITED

The following references are of record in the file of this patent:

UNITED STATES PATENTS

| Number | Name | Date |
|---|---|---|
| 2,337,103 | Heimsoeth et al. | Dec. 21, 1943 |

FOREIGN PATENTS

| Number | Country | Date |
|---|---|---|
| 9,611 | Great Britain | 1893 |
| 552,783 | France | 1923 |
| 590,651 | Germany | 1934 |
| 446,970 | Great Britain | 1936 |
| 702,057 | Germany | 1941 |
| 218,086 | Switzerland | 1942 |

OTHER REFERENCES

American Ceramic Society Transactions VII (1900).